United States Patent [19]
Fishman

[11] Patent Number: 5,381,953
[45] Date of Patent: Jan. 17, 1995

[54] FAIL-OPEN LOCKING ELEMENT AND THERMOSTAT INCORPORATING SAME

[76] Inventor: Joseph Fishman, 102 Teefy Ave., Richmond Hill, Ontario, Canada, M1R 3A6

[21] Appl. No.: 209,860

[22] Filed: Mar. 14, 1994

Related U.S. Application Data

[63] Continuation-in-part of Ser. No. 23,821, Feb. 23, 1993, Pat. No. 5,294,046.

[51] Int. Cl.$^6$ ............................................. F01P 7/16
[52] U.S. Cl. .............................. 236/34.5; 236/DIG. 2
[58] Field of Search ............... 236/34.5, 34, DIG. 2; 137/467

[56] References Cited

U.S. PATENT DOCUMENTS

| | | | |
|---|---|---|---|
| 452,360 | 5/1891 | Burnham | 137/467 |
| 2,387,792 | 10/1945 | Holmes | 236/DIG. 2 |
| 2,710,146 | 6/1955 | Drapeau | 236/DIG. 2 |
| 2,842,317 | 7/1958 | Wood | 236/DIG. 2 |
| 3,087,509 | 4/1963 | Turner | 137/467 |
| 3,558,046 | 1/1971 | Kelly | 236/DIG. 2 |
| 4,570,719 | 2/1986 | Wilk | 137/467 |
| 4,883,225 | 11/1989 | Kitchens | 236/34.5 |
| 5,188,287 | 2/1993 | Chamot | 236/DIG. 2 |

Primary Examiner—William E. Tapolcai
Attorney, Agent, or Firm—Bereskin & Parr

[57] ABSTRACT

There is provided a locking element and a thermostat incorporating same for use in a liquid-cooling system. The locking element has a body portion and an end portion for attaching the locking element to the thermostat. In first and second embodiments, a tab extending from the body portion locks the displaceable valve of the thermostat in an open position when the valve has been displaced a pre-determined amount. In the first embodiment of the locking element, at least one aperture is defined in the end portion to attach the end portion to a lower bridge of the thermostat. In this embodiment, two locking elements are attached to the thermostat on opposing sides of the displaceable valve. In a second embodiment of the locking element, the end portion rests against the bottom member of the lower bridge of the thermostat. In this embodiment, two body portions extend from the end portion to opposing sides of the displaceable valve. In a third embodiment, the end portion abuts against the upper bridge and the body portion abuts against the displaceable valve. In this embodiment, the body portion springs to lock the displaceable valve when it had been displaced a pre-determined amount.

16 Claims, 6 Drawing Sheets

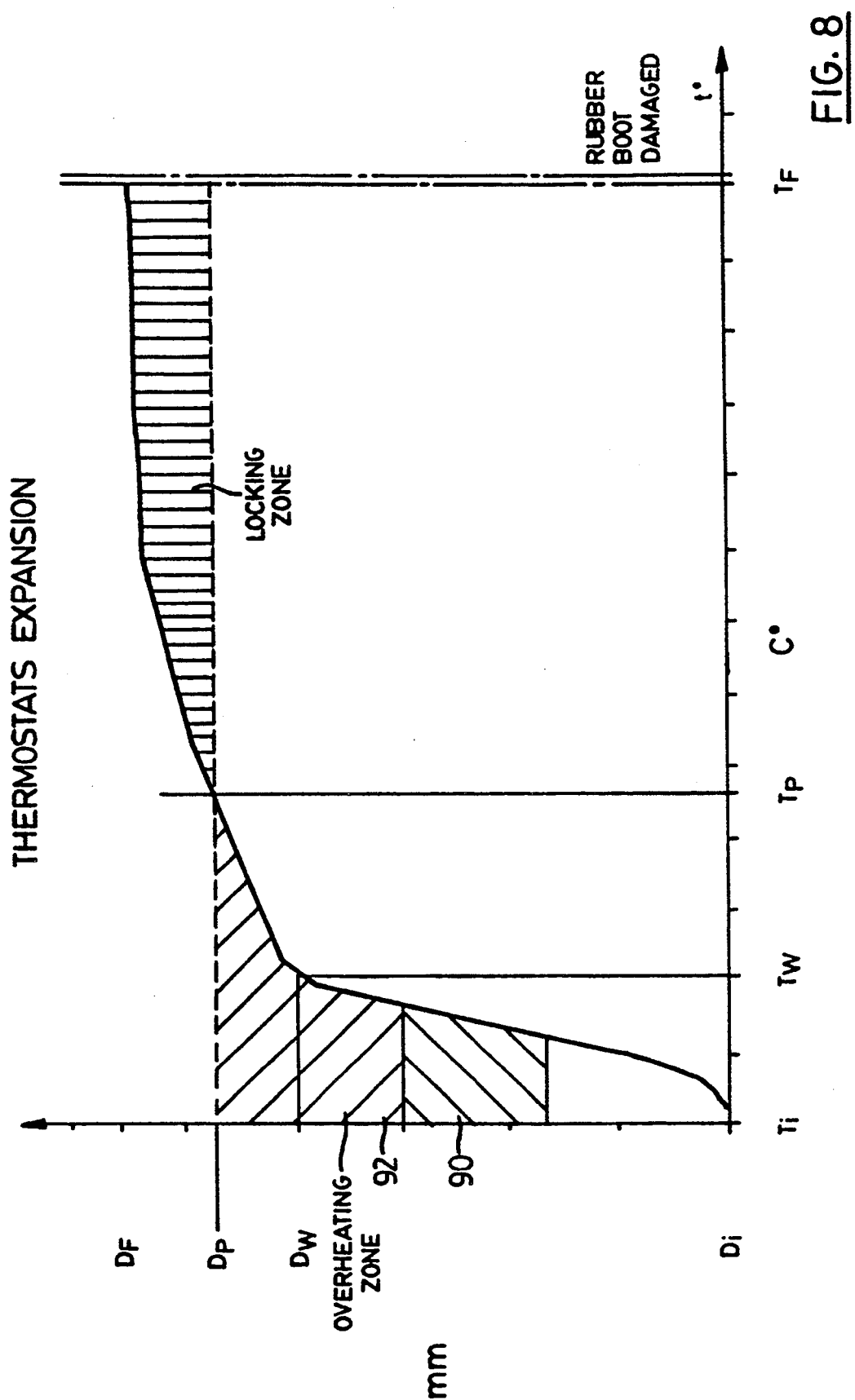

FAIL-OPEN LOCKING ELEMENT AND THERMOSTAT INCORPORATING SAME

This application is a continuation-in-part of Ser. No. 08/023,821 filed Feb. 23, 1993, now U.S. Pat. No. 5,294,046.

FIELD OF THE INVENTION

This invention relates generally to the field of thermostats such as may be used in liquid-cooling systems and in particular relates to the type of thermostat that incorporates a temperature sensitive valve which varies the liquid flow rate according to temperature.

BACKGROUND OF THE INVENTION

Thermostats of the type used for temperature regulation in liquid-cooling systems are typically disposed in a closed flow loop of conduits which also include a pump and a heat exchanger such as a radiator or similar devices. Such thermostats usually incorporate a valve which may be opened according to the temperature of the cooling liquid. By varying the opening of the valve, control of the flow of liquid to the heat exchanger or radiator can be effected whereby the temperature of the liquid can be regulated. Typically the valve is displaced by a temperature sensitive plunger which acts against a spring which biases the valve to the closed position. In the closed position no liquid flows to the heat exchanger or radiator. However, when the temperature of the liquid exceeds the desired value the plunger displaces the valve into an open position, against the spring, to allow a desired amount of liquid to flow through the heat exchanger or radiator. In this manner the liquid temperature can be controlled.

Failure of the thermostat, for example by the valve being stuck in the closed position, results in a loss of temperature control. In this circumstance the liquid is not directed to the heat exchanger or radiator and as a result the cooling properties of the system are lost. Inevitably the system intended to be cooled becomes damaged due to prolonged overheating. In an automobile engine, for instance, permanent damage can occur when the cooling system has failed.

In automobile thermostats, the temperature sensitive plunger is typically controlled by a thermally expansive composition formed, from among other things, of wax. Thermostats may malfunction for other reasons however, including corrosion to the plunger components. In an extreme overheating situation, the thermostat may be damaged, for example, by the loss of the thermally expansive wax. Regardless of why extreme overheating occurs, thermostats are typically located close enough to the parts being cooled to be damaged by the overheating. However, after extreme overheating occurs the thermostat itself will be damaged resulting in difficulty in determining whether the thermostat was damaged prior to the overheating (and thus was a contributing factor), or whether the thermostat was merely damaged as a result of the overheating. Determining if there was an intrinsic failure of the thermostat is important in apportioning fault, since the cost of repairing or replacing the damaged system, such as an automobile engine, can be very high.

One way to resolve this difficulty is disclosed in U.S. Pat. No. 4,883,225 (Kitchens). This patent discloses providing a thermostat that includes a fusible alloy in a temperature sensitive valve. When the thermostat is subjected to an extreme overheating, the fusible alloy melts causing the valve to be permanently displaced in an open position. The fluid is therefore directed to the heat exchanger even though the thermostat has failed.

The difficulty with this prior approach however is that a thermostat incorporating such a fusible alloy is very difficult to manufacture. In particular, the components of the plunger need to be manufactured under very precise tolerances, which are difficult if not impossible to achieve in mass production. Furthermore, expensive materials are required and additional steps are needed in the manufacturing process in order to assemble this device.

BRIEF SUMMARY OF THE INVENTION

What is desired is a way of assuring that the thermostat does not fail in the closed position, after it has been overheated and damaged. Preferably any solution should be simple, inexpensive and work without impeding the normal functioning of the thermostat. Also, the solution should not require difficult or impossible manufacturing standards.

According to a first aspect of the present invention there is provided a locking element for a thermostat having a displaceable valve, said locking element comprising:

- an end portion for abutting against said upper bridge; and
- a body portion for abutting against said displaceable valve, said body portion being resiliently connected to said end portion so that said body portion is biased against said displaceable valve;
- wherein a said locking element is positioned to become wedged between said upper bridge and said displaceable valve to lock said displaceable valve in an open position when said displaceable valve has been displaced a pre-determined amount, said pre-determined amount being located in the range that said displaceable valve is displaced when subjected to temperatures between the maximum normal working temperature of said thermostat and the failure temperature of said thermostat.

According to a second aspect of the present invention there is provided a thermostat for liquid-cooling systems, comprising:

- a flange having an opening;
- a valve for sealing said opening, said valve being displaceable from said opening for allowing the passage of liquid through said opening;
- an upper bridge and a lower bridge spanning said opening on opposing sides of said flange for supporting said valve and said openings;
- means for displacing said valve from said opening in response to a temperature variation, said displacing means including a pin contacting the underside of one of said bridges, at one end, and being extendably housed within a body at the other end, said body containing a temperature sensitive means for extending said pin, and said body being rigidly attached to said valve for sealing said opening in said flange when said pin is retracted relative to said body;
- a spring located between said valve and the other of said bridges for urging said valve into sealing engagement with said opening; and
- at least one locking element having
  (i) an end portion for abutting against said upper bridge, and (ii) a body portion for abutting against said displaceable valve, said body portion being resiliently connected to said end portion so that said body portion is biased against said displaceable valve, wherein said locking element is wedged between said upper bridge and said displaceable valve to lock said displaceable valve in an open position when said displaceable valve has been displaced a pre-determined amount, said pre-determined amount being located in the range that said displaceable valve is displaced when subjected to temperatures between the maximum normal working temperature of said thermostat and the failure temperature of said thermostat.

LIST OF FIGURES

FIG. 8 shows a diagram of valve disk displacement relative to temperature.

DETAILED DESCRIPTION OF THE PREFERRED EMBODIMENT

Figure 1:
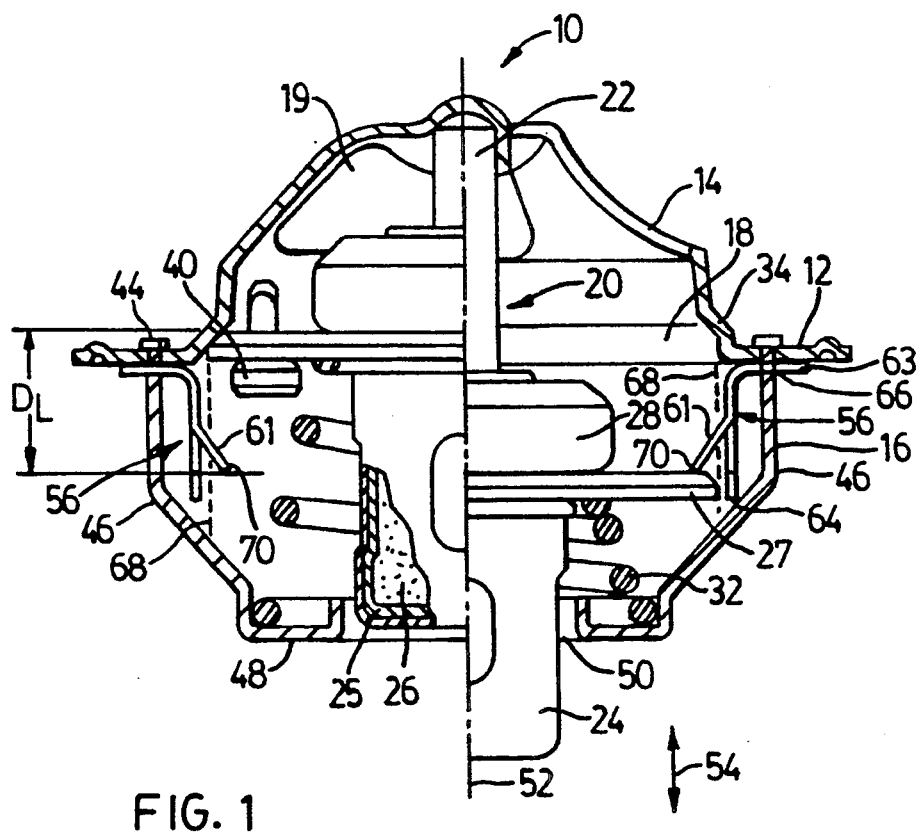
FIG. 1 shows a cross-sectional view of a thermostat containing a first embodiment of a locking element in accordance with the present invention along the lines 1—1 of FIG. 2.

A thermostat is indicated generally as 10 in FIG. 1. The thermostat 10 is a high flow type of thermostat used in automobile cooling systems. While the preferred embodiment relates to automotive thermostats, it will be appreciated that the present invention is not limited to such thermostats, and may be used in many other types of thermostats which operate in a similar manner.

Figure 2:
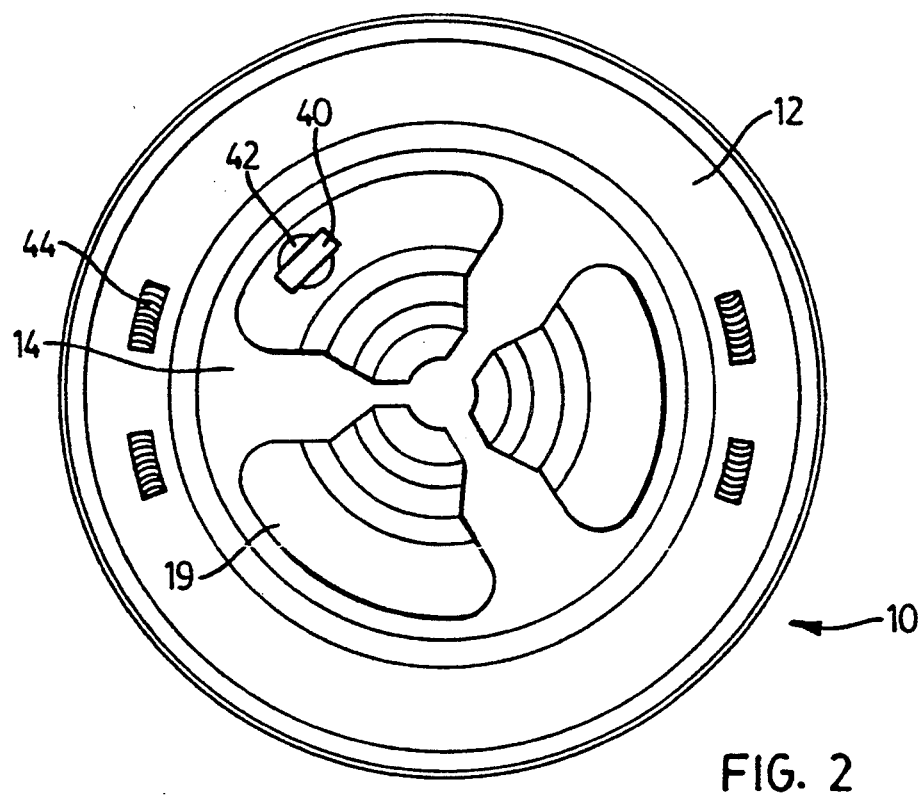
FIG. 2 shows an end view from above of the embodiment of FIG. 1.

The thermostat 10 consists of a generally circular flange 12 surrounded by a valve supporting means comprising an upper bridge 14 and a lower bridge 16. As can be seen in FIG. 2, the upper bridge 14 spans an opening 18 which is generally circular. The upper bridge 14 is cut away on opposite sides to form a further opening 19 on either side of the upper bridge 14. In the preferred embodiment of the Figures, the upper bridge is formed in one piece with the flange 12, whereas the lower bridge 16 is a separate piece fastened onto the flange 12.

Figure 5:
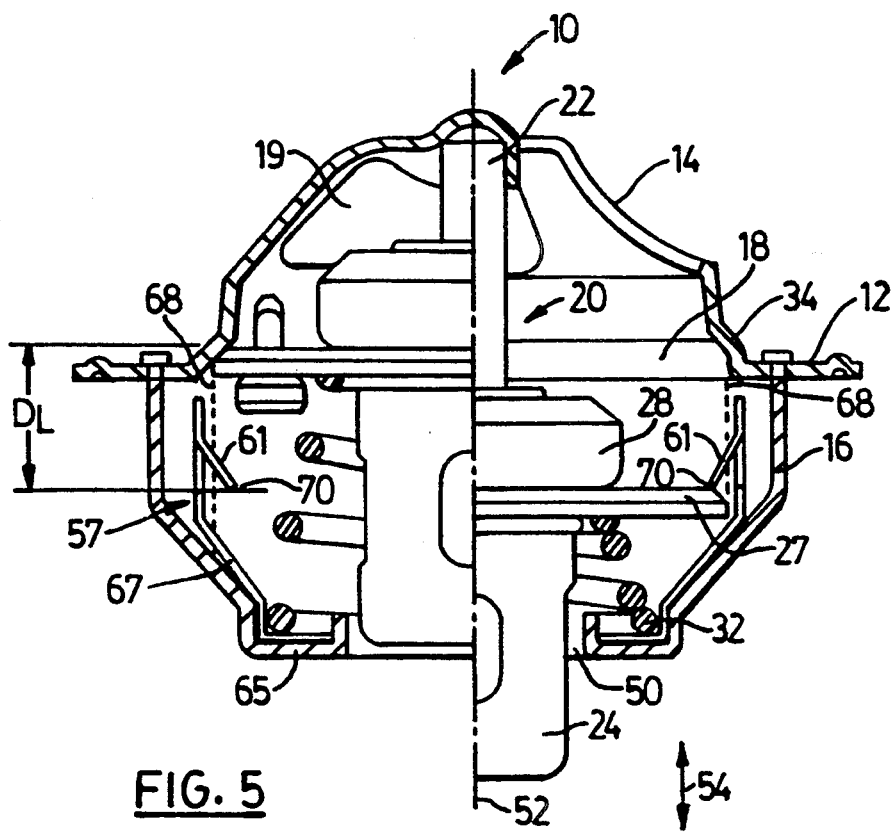
FIG. 5 shows a cross-sectional view of a thermostat containing a second embodiment of a locking element in accordance with the present invention along the lines 5—5 of FIG. 6.
Figure 6:
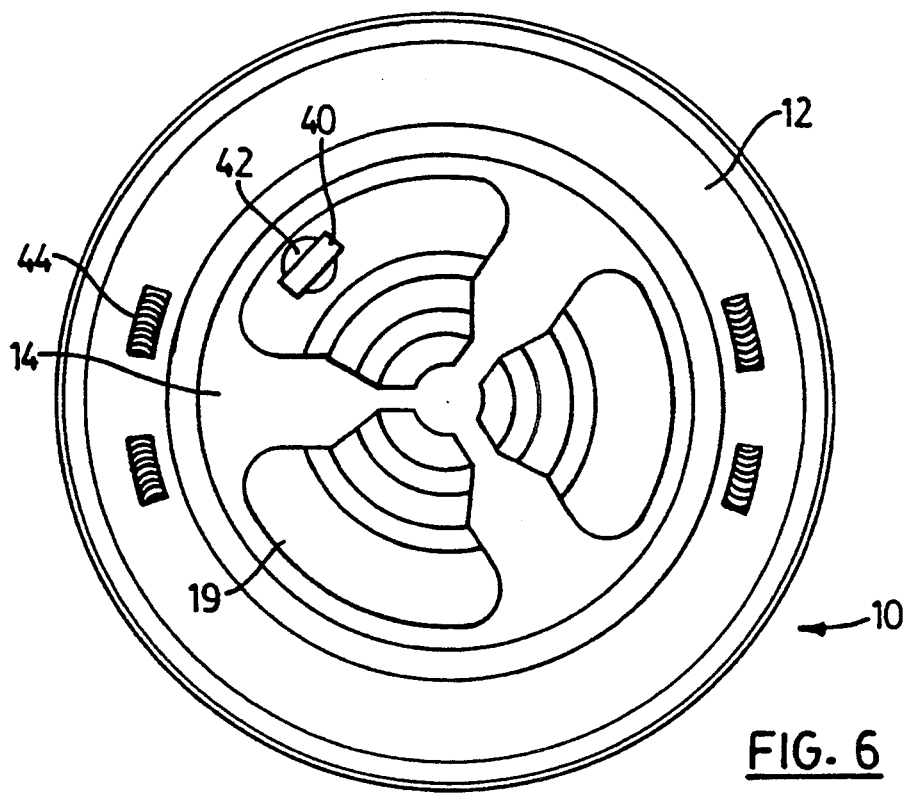
FIG. 6 shows an end view from above of the embodiment of FIG. 5.

FIG. 1 also shows a temperature sensitive valve indicated generally at 20 which comprises a pin 22 contacting the underside of the bridge 14 at one end and housed within a body 24 at the other end. The body 24 contains a rubber boot 25 containing a temperature sensitive displacement means 26 as shown in the broken away portion of FIG. 1. The temperature sensitive displacement means 26 responds to the temperature of a surrounding fluid as further described below. It will be appreciated that the left sides of FIGS. 1 and 5 show the valve 20 in a closed position, and the right sides show the valve 20 in a fully open position. These positions are described further below.

Also attached to the body 24 is a valve disk 27 which is secured around an end cap 28 of the body 24. The underside of the valve disk 27 is contacted by one end of a spring 32. The spring 32 is supported at the other end by lower bridge 16. Preferably, in the installed position, the spring 32 is under some compression whereby the valve disk 27 is urged into engagement with a shoulder 34 which surrounds the opening 18. The shoulder 34 provides a good sealing surface and if desired, the valve disk 27 may further include a rubber sealing gasket (not shown). Also shown is a jiggle pin 40 which is located in an opening 42 formed within the valve disk 27 and which is described in greater detail below.

The lower bridge 16 is typically secured to the flange 12 at either side by points 44. Tabs are extended through the flange 12 and are then sheared off to form a solid attachment between lower bridge 16 and flange 12. The lower bridge 16 extends downwardly on either side below the flange 12 along arms 46 which connect to a bottom member 48. Bottom member 48 in turn has an opening 50 which is large enough to accommodate the body 24. In this manner, the body 24 is free to move axially along the axis of line 52 in the direction of double-headed arrow 54.

Figure 3:
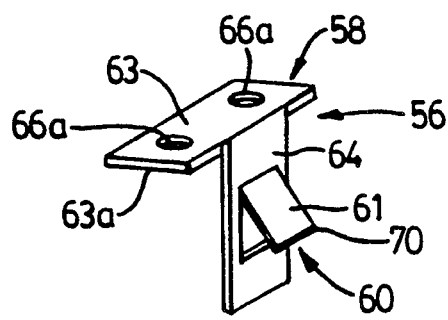
FIG. 3 shows a perspective view of the first embodiment of the locking element of FIG. 1.
Figure 7:
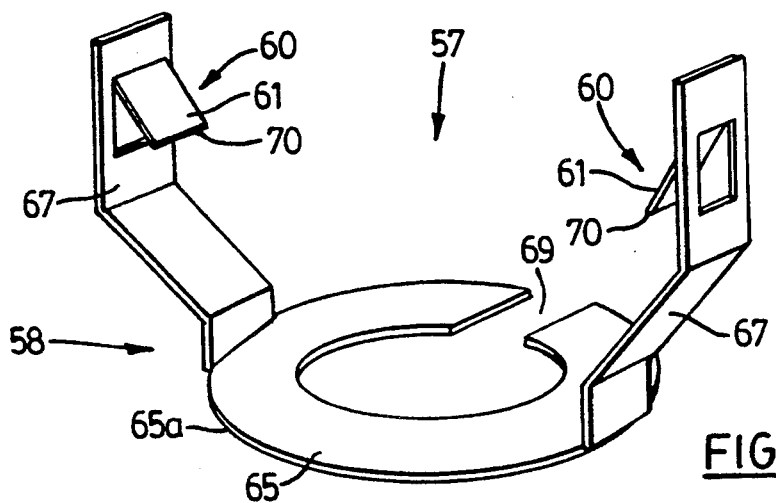
FIG. 7 shows a perspective view of the second embodiment of the locking element of FIG. 5.

Locking elements according to first and second embodiments of the present invention are generally shown respectively at 56 in FIGS. 1 and 3, and 57 in FIGS. 5 and 7. In both embodiments, the locking elements 56, 57 have an attachment means generally indicated at 58 and a locking means generally indicated at 60.

In the first embodiment of FIGS. 1 and 3, the locking element 56 has an end portion 63 and a body portion 64. The end portion 63 defines an attachment flange 63a for attaching the locking element 56 to the thermostat 10. The attachment flange 63a is received in a seat 66 defined in the lower bridge. The attachment flange 63a includes a pair of apertures 66a through which are inserted the attachment tabs of the lower bridge 16. The end portion 63 is urged firmly against the flange 12 to secure the locking element 56 when the lower bridge 16 is secured to the flange 12 by points 44. The end portion 63 may also be secured by welding, brazing or other suitable ways of attachment as will be known to those skilled in the art. To securely lock the valve 20, it is preferred to provide at least two locking elements 56, one attached to each arm 46 of the lower bridge 16.

In the second embodiment of FIGS. 5 and 7, the locking element 57 has an end portion 65 and body portions 67. The end portion 65 and body portions 67 have a similar function as the corresponding elements in the first embodiment. The end portion 65 defines an attachment flange 65a for attaching the locking element 56 to the thermostat 10. The attachment flange 65a is semi-annular and rests against the bottom member 48 of the lower bridge 16. The spring 32 urges the attachment flange 65a against the bottom member 48 to hold the locking element 57 in place. There are two preferred configurations of attachment flange 65a, namely, one that is ring-shaped with an opening 69 to allow the locking element 57 to be assembled onto the thermostat after the thermostat is fully made, or one that is entirely ring-shaped which is assembled under the spring as the thermostat is assembled. As seen in FIG. 7, the locking element 57 has two body portions 67 which are adapted to extend on opposing sides of the valve 20 to securely lock the valve 20.

For both embodiments, the body portions 64, 67 of the locking elements 56, 57 are shaped to generally follow the profile of the adjacent arm 46 of the lower bridge 16. The body portions 64, 67 are located outside of a path 68 that the periphery of the valve disk 27 follows when the body 24 moves along the axis 52 in the direction of double arrow 54.

In both embodiments, the locking means 60 comprises a tab 61 that extends at an angle inwardly and downwardly from the body portion 64, 67 into the path 68 of the valve disk 27. Alternatively, the locking means 60 could be an aperture defined in the body portion 64, 67 that is adapted to receive the periphery of the valve disk 27 to lock the valve 20 (in such a case, the body portion 64, 67 would extend into the path 68 of the valve disk 27 to enable the locking means 60 to operate). In a further alternative, the locking elements 56, 57 could be attached to the underside of the valve disk 27, and the locking means 60 could be spring biased against the arms 46 of the lower bridge 16. In such a case, the spring biased locking means 60 could extend through an aperture in the arm 46 to lock the valve 20.

Figure 4:
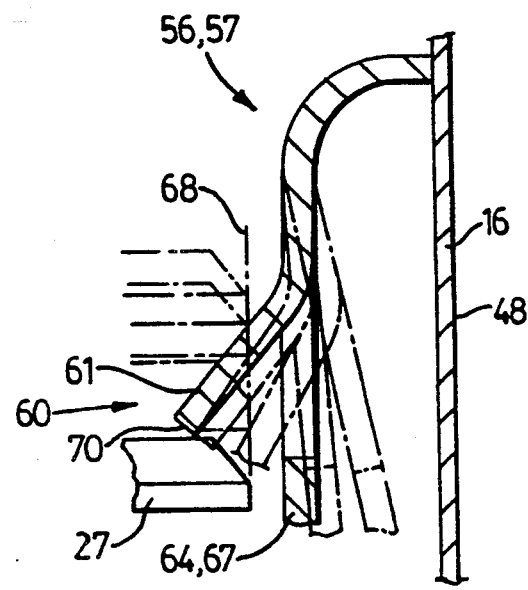
FIG. 4 shows an enlarged view of a locking element in accordance with the present invention as it flexes under contact with a valve.

As shown in FIGS. 1 and 5, the body portion 64, 67 is spaced from the arm 46 of the lower bridge 16 at the point where the tab 61 is located. As shown in FIG. 4, the space allows the body portion 64, 67 to flex outwardly towards the adjacent arm 48 to accommodate the passage of the valve disk 27 as it moves along the path 68. When the valve disk 27 moves downwardly past the locking means 60, the body portion 64, 67 springs back to its original position and the tab 61 blocks the return path 68 of the valve disk to prevent the valve disk 27 from being urged by the spring 32 back to its closed position.

As shown in FIGS. 3 and 7, the locking element 56, 57 is formed from a single piece of resiliently flexible material, such as stainless steel or other material. The tab 61 is cut from the body portion 64, 67 and bent inwardly into the path of the valve disk 27. Alternatively, the locking elements 56, 57 could be formed from a rigid material, such as steel, and combined with a spring to provide the spring biased locking means 60 described earlier. For automobile thermostats, the locking means 60 should be capable of resisting a force of up to 50 kilograms. The flexing capacity of such thermostats should be between 3 and 10 kilograms approximately.

For both embodiments, the tab 61 terminates in an engaging surface 70 that is spaced a pre-determined locking distance $D_L$ from the shoulder 34. The engaging surface 70 defines the point at which the valve disk 27 becomes locked. The engaging surface 70 engages the valve disk 27 to prevent the valve disk 27 from returning to the closed position. The pre-determined locking distance $D_L$ corresponds to the distance the valve disk 27 is displaced when the thermostat 10 has been subjected to a pre-determined extreme temperature $T_L$ as described further below.

Figure 9:
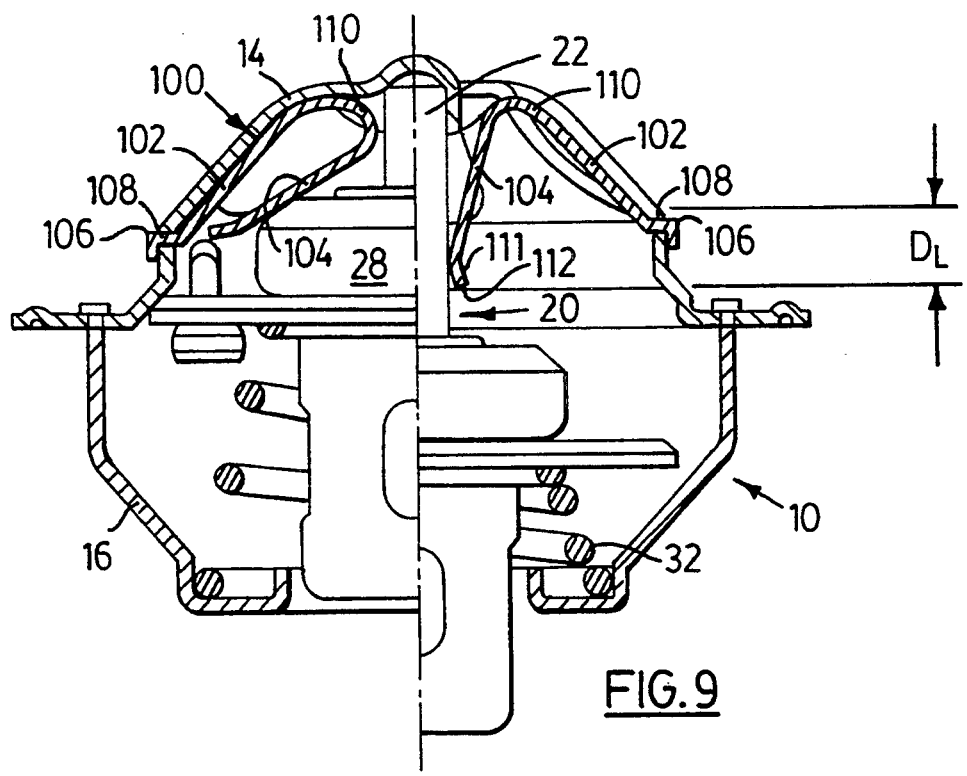
FIG. 9 shows a cross-sectional view of a thermostat containing a third embodiment of a locking element in accordance with the present invention along the lines 9—9 of FIG. 10.
Figure 10:
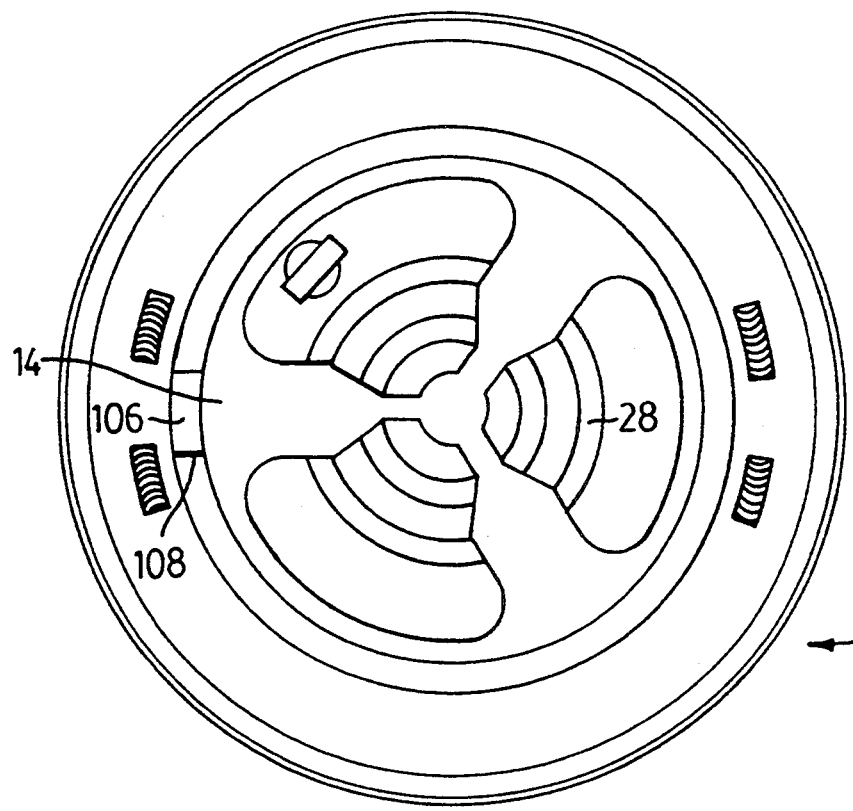
FIG. 10 shows an end view from above of the embodiment of FIG. 9.
Figure 11:
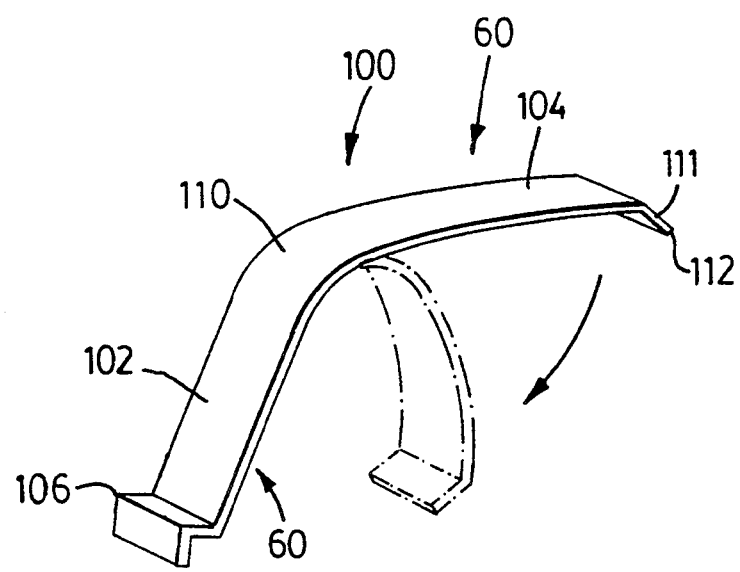
FIG. 11 shows a perspective view of the third embodiment of the locking element of FIG. 9.

A third embodiment of locking element is indicated generally at 100 in FIGS. 9-11. The locking element 100 has an end portion 102 and a body portion 104. The end portion 102 and body portion 104 have a similar function as the corresponding elements in the first and second embodiments of locking element 56, 57. The end portion 102 is shaped to abut against the underside of the upper bridge 14. The end portion 102 includes a shaped lip 106 that is adapted to extend through an opening 108 defined in the upper bridge 14 of the thermostat 10. The shaped lip 106 restricts the end portion 102 from sliding along the upper bridge 14.

The end portion 102 is urged against the underside of the upper bridge by the body portion 104 which abuts against the end cap 28 of the displaceable valve 20. The end portion 102 may alternatively be secured to the underside of the upper bridge by welding, brazing or other suitable ways of attachment as will be known to those skilled in the art.

The body portion 104 is adapted to move in response to movements of the displaceable valve 20. A resiliently flexible integral bend 110 connecting the end portion 102 to the body portion 104 acts as a spring to urge the two portions 102, 104 apart. The locking element 100 may be initially formed as a flat piece, with the integral bend 110 being defined when the end portion 102 is folded or compressed towards the body portion 104. It has been found that forming the locking element 100 from a stainless steel spring material provides suitable resiliency.

The locking element 100 is therefore folded over and compressed between the upper bridge 14 and the end cap 28. Accordingly, as the end cap 28 of the displaceable valve 20 moves downwardly, the body portion 104 moves towards the centre pin 22. Once the end cap 28 moves downwardly beyond a pre-determined point, the free end of the body portion 104 clears the top of the end cap 28 and the body portion 104 springs into abutment with the pin 22 (see the right side of FIG. 9). At this point, the body portion 104 acts as a locking means 60 to lock the displaceable valve 20. The body portion 104 is constructed to be sufficiently rigid along its length to avoid bending under the force of the spring 32 when the valve is locked. As a precaution, a portion 111 of the body portion 104 is angled adjacent the free end. The angled portion 111 encourages the body portion 104 to bend towards the pin 22 if the force of the spring 32 is such as to cause the body portion 104 to bend. Because the end 102 is abutting against the underside of the upper bridge 14 and the angled portion 111 is abutted against the end cap 28, the bend of body portion 104 will be supported by the pin 22, preventing unwanted failure of the locking element 100. Thus, the displaceable valve 20 will be restricted from returning completely to its closed position because the locking element 100 is wedged between the end cap 28 and the upper bridge 14.

The free end of the body portion 104 defines an engaging surface 112 for lockably engaging the displaceable valve 20. The length of the body portion 104 is chosen so that the displaceable valve 20 will become locked once it travels beyond the pre-determined locking distance $D_L$. Once the end cap 28 moves beyond distance $D_L$ the body portion 104 will spring into abutment against the centre pin 22. The engaging surface 112 of the body portion 104 will then engage the end cap 28 of the displaceable valve 20 when it attempts to return to the closed position.

The thermostat 10 is installed in the liquid cooling system of a vehicle. For example, the thermostat 10 may be installed on the upper return line of the cooling system in line with the cooling liquid so that the cooling liquid has to flow through and around the thermostat 10 in order to circulate. The return line then feeds into the top of a radiator structure or heat exchanger which acts as a way of dissipating excess heat carried by the cooling liquid. A line then is fed from the bottom of the radiator to a water pump or the like which typically forces the liquid back into the engine block where the cooled liquid is used to cool portions of the engine block (by absorbing heat). As will be appreciated by those familiar with engines, in other systems, the thermostat may be placed in the bottom and the circulation will go in the opposite direction from the bottom to the top.

The thermostat 10 is situated in the cooling line in such manner that the body 24 is exposed to the heated cooling fluid. It is preferable for the body 24 to be fully immersed and therefore the valve 10 may be located somewhat below the highest liquid level of the coolant in the cooling system, on the engine side.

When the motor or vehicle is running, heat is generated in the engine block which in turn is passed into the liquid coolant. As the temperature of the coolant rises, the temperature rises around body 24. This has the effect of causing temperature sensing means 26 to expand. As temperature sensing means 26 expands, the pin 22 is forced axially outwardly of the body 24. The end of the pin 22 engages the underside of the bridge 14 which in turn causes the body 24 to move axially in the direction of arrow 54. This unseats the groove 30 of the valve disk 27 from the shoulder 34 allowing cooling fluids to pass through opening 18 and out openings 19. The fluids then are permitted to return to the radiator or heat exchanger.

The purpose of the jiggle pin 40 is to provide a form of pressure relief across the valve 20. In the event that the liquid coolant heats up too quickly, for example, a pressure differential can be built up under the valve disk 27. Such pressure is permitted to escape past the jiggle pin 40 before it builds up to an extent which would prevent the pin 22 from pushing the valve to an open position. As will be appreciated, if there was a great pressure differential between the two sides of the valve disk 27, this would require much more work by the pin 22 to open the valve which is undesirable.

FIG. 8 provides a diagram showing the displacement of the valve disk 27 relative to changes in temperature.

As shown, the valve disk 27 (and accordingly also the end cap 28) is displaced under normal working conditions from its initial position $D_i$ at initial temperature $T_i$ up to a distance $D_w$ at a maximum normal working temperature $T_w$. The range between temperatures $T_i$ and $T_w$ is the normal working zone of the thermostat and will vary according to the design characteristics of the thermostat.

As the temperature exceeds $T_w$, the valve disk 27 is further displaced, and then will reach the pre-determined locking distance $D_L$ at the pre-determined extreme temperature $T_L$. The range between temperatures $T_w$ and $T_L$ is an overheating buffer zone for the thermostat. While the temperatures in this zone exceed the normal working temperatures of the thermostat, they are not considered to be high enough that permanent damage is likely to occur to either the motor, or the thermostat itself.

At the pre-determined extreme temperature $T_L$ the thermostat is being subjected to extreme overheating and at this point there may be a risk of damage to the thermostat and to the motor. Further increases in temperature above the pre-determined temperature $T_L$ cause a further displacement of the valve disk 27 up to a failure distance $D_f$ where a failure temperature $T_f$ is reached. At this point, the internal components of the thermostat 10 will absolutely fail. For conventional automotive thermostats, failure typically occurs when the internal rubber boot 25 containing the temperature sensitive wax 26 becomes damaged at temperature $T_f$. When the thermostat has failed, the pin 22 no longer acts to force the valve disk 27 axially outwardly from the body 24 and consequently the spring 32 urges the valve disk 27 upwardly towards the closed position against the shoulder 34. However, since the valve disk 27 has been displaced beyond the pre-determined distance $D_L$ the locking means 60 prevents the valve disk 27 from returning to the closed position.

The pre-determined locking distance $D_L$ is thus set between the maximum normal working distance $D_w$ and the failure distance $D_f$. Preferably, the overheating buffer zone is provided to account for minor, non-detrimental, temperature increases above the working zone. However, once $D_L$ has been reached, the engaging surface 70, 112 will engage the displaceable valve 20 to prevent the valve disk 27 from returning to the closed position.

It will be appreciated by one skilled in the art that the operating parameters of the thermostat 10 will vary according to the particular operating parameters of the cooling system for which it is designed. By way of example, a table of operating parameters for a sampling of differently rated automotive cooling system thermostat is provided below (with tolerances shown in brackets). It should be noted that for such thermostats full opening of the valve 20 is typically required at the maximum normal working temperature $T_w$. The corresponding maximum normal working displacement distance $D_w$ is typically between 7 and 8 mm (as indicated below), although the average working displacement typically is less, approximately one half of the maximum, about 3.5 to 4 mm. This forms an average working zone as shown in FIG. 8 as 90. The limits of this zone will vary depending upon particular engine characteristics. At 92, another zone is shown which represents a beginning to overheat condition.

|  | Ratings | | | | |
| --- | --- | --- | --- | --- | --- |
|  | 71° C. (± 2° C.) | 77° C. (± 2° C.) | 82° C. (± 2° C.) | 88° C. (± 2° C.) | 91° C. (± 2° C.) |
| $D_i$ (mm) | 0 | 0 | 0 | 0 | 0 |
| $T_i$ (°C.) | 71 | 77 | 82 | 88 | 91 |
| $D_w$ (mm) (approx) | 7 to 8 | 7 to 8 | 7 to 8 | 7 to 8 | 7 to 8 |
| $T_w$ (°C.) | 81 | 87 | 92 | 98 | 101 |
| $D_L$ (mm) (approx) | 9.5 | 9.5 | 9.5 | 9.5 | 9.5 |
| $T_L$ (°C.) | 93 | 85 | 90 | 96 | 99 |
| $D_f$ (mm) (approx) | 11 | 11 | 11 | 11 | 11 |
| $T_f$ (°C.) | 135 | 135 | 135 | 135 | 135 |

It can now be appreciated how the present invention operates. Under normal working conditions, the valve 20 will operate in a conventional manner to control the flow of coolant through the opening 18. As the operating temperatures increase beyond the normal working temperatures, the valve will continue to operate. When the operating temperatures exceed the pre-determined locking temperature $T_L$ (at which point extreme overheating is occurring), the locking means 60 blocks the return path 68 of the valve 20 to lock the thermostat 10 in an open position. Thereafter, if the thermostat is subjected to such extreme temperatures that failure occurs, the locking means 60 prevents the valve 20 from returning to seal the opening 18. Thus, unlike conventional thermostats, the locking means 60 ensures that the valve remains open before, during, and after the thermostat fails due to overheating.

It will be appreciated that the preferred locking is achieved by two locking means, one on each side of the valve 20. In the third embodiment, only one such locking means is required. Even once locked, the locking elements may be released, by a simple use of a screwdriver point or the like.

It will be appreciated that the foregoing description is in respect of a preferred embodiment of the invention and that various modifications are possible within the broad scope of the appended claims. Some of these modifications have been discussed above and others will be apparent to those skilled in the art. For instance, the locking element 56, 57, 100 may be used with many types of automotive thermostats, including by-pass thermostats, or may be used for any heating systems in which temperature control is applied. The locking element 56, 57, 100 may be adapted for use in other types and configurations of thermostats or heat controllers not necessarily directed to automotive cooling systems.

I claim:

1. A locking element for a thermostat having a displaceable valve supported by upper and lower bridges, said locking element comprising:
   an end portion for abutting against said upper bridge; and
   a body portion for abutting against said displaceable valve, said body portion being resiliently connected to said end portion so that said body portion is biased against said displaceable valve;
   wherein said locking element is positioned to become wedged between said upper bridge and said displaceable valve to lock said displaceable valve in an open position when said displaceable valve has been displaced a pre-determined amount, said pre-determined amount being located in the range that said displaceable valve is displaced when subjected to temperatures between the maximum normal working temperature of said thermostat and the failure temperature of said thermostat.

2. A locking element as claimed in claim 1, wherein said end portion and said body portion are integrally connected.

3. A locking element as claimed in claim 2, wherein said end portion and said body portion are connected by a resiliently flexible integral bend.

4. A locking element as claimed in claim 3, wherein said body portion includes an engaging surface for lockably engaging said displaceable valve.

5. A locking element as claimed in claim 4, wherein said engaging surface is defined by a free end of said body portion.

6. A locking element as claimed in claim 2, wherein said end portion is folded toward said body portion to facilitate said locking element being positioned between said upper bridge and said displaceable valve.

7. A locking element as claimed in claim 5, wherein a portion of said body portion adjacent said free end extends at an angle relative to the remainder of said body portion.

8. A locking element as claimed in claim 5, wherein said end portion includes a shaped lip for extending through an opening defined in said upper bridge, said shaped lip acting to restrict movement of said end portion along said upper bridge.

9. A thermostat for liquid cooling systems, comprising:
   a flange having an opening;
   a valve for sealing said opening, said valve being displaceable from said opening for allowing the passage of liquid through said opening;
   an upper bridge and a lower bridge spanning said opening on opposing sides of said flange for supporting said valve and said openings;
   means for displacing said valve from said opening in response to a temperature variation, said displacing means including a pin contacting the underside of one of said bridges, at one end, and being extendably housed within a body at the other end, said body containing a temperature sensitive means for extending said pin, and said body being rigidly attached to said valve for sealing said opening in said flange when said pin is retracted relative to said body;
   a spring located between said valve and the other of said bridges for urging said valve into sealing engagement with said opening; and
   at least one locking element having
   (i) an end portion for abutting against said upper bridge; and
   (ii) a body portion for abutting against said displaceable valve, said body portion being resiliently connected to said end portion so that said body portion is biased against said displaceable valve,
   wherein said locking element is positioned to become wedged between said upper bridge and said displaceable valve to lock said displaceable valve in an open position when said displaceable valve has been displaced a pre-determined amount, said pre-determined amount being located in the range that said displaceable valve is displaced when subjected to temperatures between the maximum normal working temperature of said thermostat and the failure temperature of said thermostat.

10. A thermostat as claimed in claim 9, wherein said end portion and said body portion are integrally connected.

11. A thermostat as claimed in claim 10, wherein said end portion and said body portion are connected by a resiliently flexible integral bend.

12. A thermostat as claimed in claim 11, wherein said body portion includes an engaging surface for lockably engaging said displaceable valve.

13. A thermostat as claimed in claim 12, wherein said engaging surface is defined by a free end of said body portion.

14. A thermostat as claimed in claim 10, wherein said end portion of said locking element is folded toward said body portion to facilitate said locking element being positioned between said upper bridge and said displaceable valve.

15. A locking element as claimed in claim 13, wherein a portion of said body portion adjacent said free end extends at an angle relative to the remainder of said body portion.

16. A thermostat as claimed in claim 14, wherein said end portion includes a shaped lip for extending through an opening defined in said upper bridge, said shaped lip acting to restrict said end portion along said upper bridge.

* * * * *